Jan. 5, 1965  F. A. KIRCHHUBEL  3,164,701
METHOD OF ASSEMBLING THERMOSTATIC SWITCHES
Filed May 29, 1961

Frederick A. Kirchhubel,
Inventor.
Koenig, Pope, Senniger and Powers,
Attorneys.

United States Patent Office 3,164,701
Patented Jan. 5, 1965

3,164,701
METHOD OF ASSEMBLING THERMOSTATIC SWITCHES
Frederick A. Kirchhubel, Versailles, Ky., assignor to Texas Instruments Incorporated, Dallas, Tex., a corporation of Delaware
Filed May 29, 1961, Ser. No. 113,498
2 Claims. (Cl. 200—138)

This invention relates to subassemblies for thermostatic electrical switches, and with regard to certain more specific features, to switch structure adaptable for improved assembly of automatic reset switches.

Among the several objects of the invention may be noted the provision of a subassembly for thermostatically controlled electrical switches and particularly the snap-acting type, incorporating improved features of form and adjustment upon assembly adapted to save manufacturing costs while preserving the accurate dimensional relationships required for a high-quality product; and the provision of switches of the class described which may conveniently be made up in the so-called automatic reset type or the like. Other objects and features will be in part apparent and in part pointed out hereinafter.

The invention accordingly comprises the elements and combinations of elements, steps and sequence of steps, features of construction and manipulation, and arrangements of parts which will be exemplified in the constructions and methods hereinafter described, and the scope of which will be indicated in the following claims.

Figure 1:
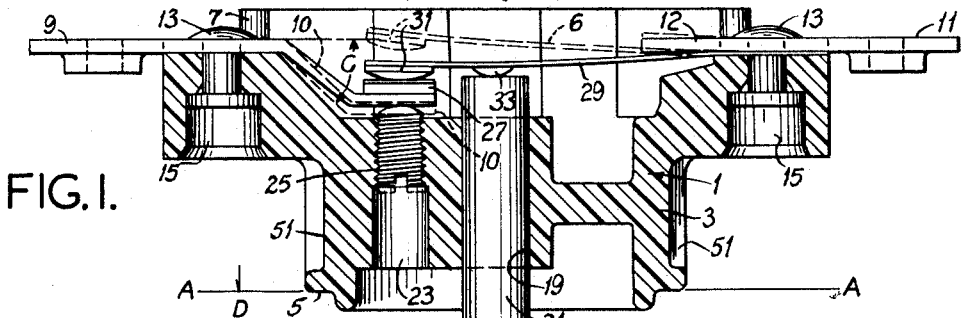
Figure 2:
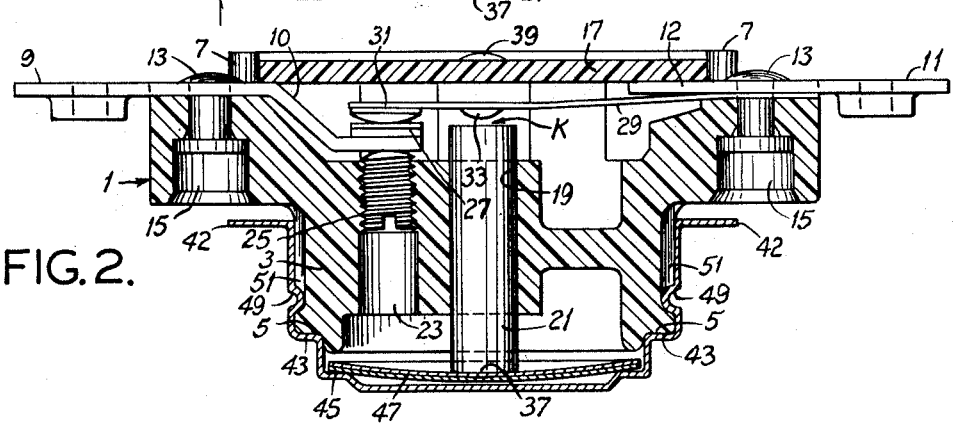
Figure 3:
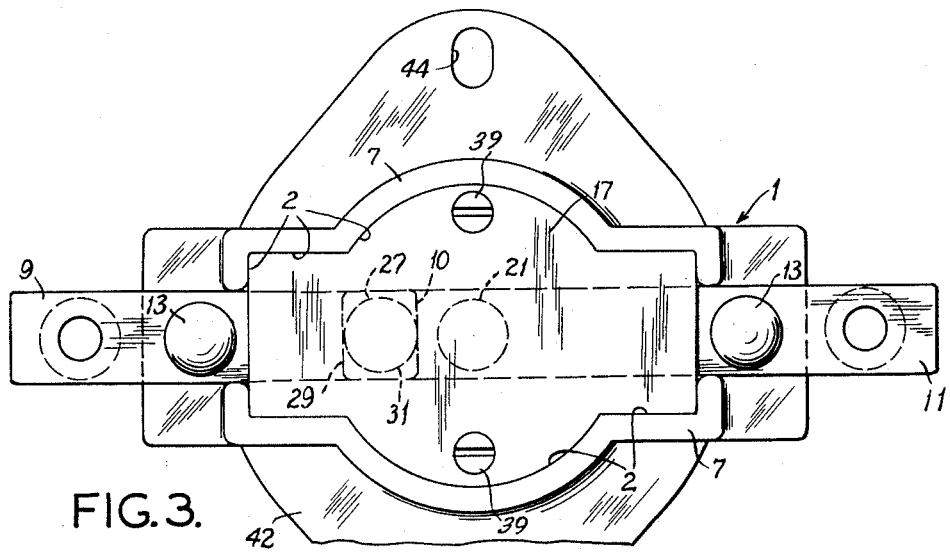

In the accompanying drawings, in which one of various possible embodiments of the invention is illustrated, FIG. 1 is an axial section of a primary subassembly of parts useful for constructing an automatic reset type of thermostatic switch;

FIG. 2 is a view similar to FIG. 1, showing the addition of certain parts to produce an automatic reset type of switch from the parts shown in FIG. 1; and FIG. 3 is a plan view of FIG. 2.

Corresponding reference characters indicate corresponding parts throughout the several views of the drawings.

The manufacture of thermostatic switches employing transfer pins or the like has heretofore been beset with certain difficulties. If a pin is too short it will not transfer sufficient motion to open the contacts properly upon tripping. If it is too long, it may transmit undesirable creep action of the thermostat to the contacts. Since in many thermosats the usable working travel of the thermostatic disc used as a sensing element is small, a total travel of .010″ being not uncommon, the selection of the proper reset pin length becomes bothersome and expensive.

Briefly, a switch made according to the present invention comprises a primary subassembly, with contacts therein operated by a snap-acting thermostatic disc which delivers its motion to one of the contacts through a transfer pin or the like. By means of the invention, certain adjustments are provided during subassembly which will permit the use of fairly widely variable lengths of transfer pins without encountering the stated difficulties. This is accomplished by providing adjustments that can be made during assembly to accommodate dimensional variations in parts of the subassembly. Selection of parts of exactly correct sizes is no longer required, and the individual parts do not require individual measurements, sorting or stocking, preparatory to assembly. They need to be only of approximately correct sizes.

Referring now more particularly to FIG. 1, which shows a primary subassembly, there is illustrated a body structure 1 in the form of a housing or frame composed of molded insulating material. The body 1 is made up with a cup-shaped cylindrical portion 3, having an outside flat stop-forming portion or shoulder 5 which establishes a reference plane A—A. Extending from the top of the body 1 is a flange formation 7. The top of the body 1 is slotted through the formation 7 to an appropriate depth for the reception of conductive terminal strips 9 and 11. The strips 9 and 11 are held by rivets 13 in openings 15 of the body 1. A nest 2 is formed by the flange formation 7. The shape of the nest 2 is such as to receive a flat cover 17, as shown in FIGS. 2 and 3.

At numeral 19 is shown a central axial opening or passage (preferably cylindrical in cross section) for the reception of a ceramic or like insulating transfer pin 21 of like cross section. Such pins are not readily obtainable to close tolerances in length. At numeral 23 is shown an outside-access opening, the inner end of which is threaded for the final reception of a set screw 25.

The terminal strip 9 is riveted in place either before the set screw is inserted or, if the set screw is inserted, before it has been advanced. Terminal strip 9 is originally so formed that when it is initially riveted in place its inner end 10 assumes the dotted-line position shown at the upper left in FIG. 1, with the screw 25 either missing or backed off if inserted. This inner end 10 carries a fixed contact 27. Attached to the inner end 12 of terminal 11 is a cantilever spring contact arm which carries a movable contact 31. This spring arm extends transversely across the end of pin 21. The inner ends 10 and 12 of terminals 9 and 11, respectively, are bendable and thus constitute adjustable movable hinge means. In its initially riveted position (either before the set screw is inserted or, if it is inserted, backed off) the terminal 9 is formed at angle C, as shown by the dotted lines in FIG. 1.

Next, a transfer pin 21, which may be a master or one from a lot to be used, is inserted into the opening 19 and located with its lower end at the distance D from plane A—A (for example, at .070 inch). This distance has been predetermined as the one to be downwardly terminated by end 37 of pin 21 within the pure snap-acting range of a bimetallic thermostatic disc 47 such as shown in FIG. 2. The pin is held in this position by means of a suitable fixture which is capable of holding the pin 21 at distance D against downward force on the pin up to a certain critical value, say three ounces. The fixture is provided with means indicating when such critical force has been reached. There are various jigs and fixtures available for the purpose. The critical force is that which determines the contact pressure of several ounces between contacts, to be described.

Next, with the pin 21 positioned as above described, the inner end of the terminal 11 is bent from its original dotted-line position 6 to cause the spring arm 29 to engage the top of the pin. Bending is continued until said pressure, for example, 3 oz., is indicated by the fixture at distance D. It will be appreciated that, after bending has been completed, with the pin in the location stated, which is its solid-line position in FIG. 1, the inner end 10 of the terminal strip 9 is still in its dotted-line position at angle C with the contacts open. Then set screw 25 may be inserted (or if already inserted in its backed-off position) may be screwed in until the fixed contact at the inner end of strip 9 just touches the movable contact 31 in the solid-line position shown in FIG. 1. At this time, pin 21 is held in place as indicated in FIG. 1. This bends the inner end 10 of terminal 9 upward, so as to reduce the angle C. This finally bent position is maintained by the set screw 25 in its final position. It will be understood that while the screw 25 is a convenient means for effecting this bending operation, it might be omitted and the bending of the inner end 10 of strip 9 accomplished otherwise. The subassembly of FIG. 1 is now in a condition that when the fixture is removed, whether or not the pin is left in place, the assembly will have the proper contact pressure for subsequent operation of the switch.

As will be noted from FIGS. 1 and 2, the spring arm 29 carries on its underside a lug 33. Use of this will be described below.

The completed structure for constructing an automatic reset switch is shown in FIG. 2. The cover 17 is held by fasteners shown at 39. The other end of the body 1 is covered by a telescoped metal cup 41 which is held in position by dimples 49 formed in grooves 51. The cup 41 is flanged to form ears 42 in which are openings 44 for supporting or mounting purposes. The cup 41 is also formed with a shoulder 43, which is forced up against the shoulder or stop portion 5 so as accurately to position a shelf portion 45 thereof. Resting upon the shelf portion 45 is a bimetallic snap-acting thermostatic disc 47, the normal contacts-closed position of which is downwardly convex as shown, and the snapped contacts-open or tripped position of which is upwardly convex. It will be understood that the established distance D (FIG. 1) takes into account the curvature of the disc 47, so that after assembly as shown in FIG. 2, a clearance K is established between the upper end of the transfer pin and the lower lug 33 when the pin 21 rests on the disc 47. This clearance, by allowing some free movement of the pin 21 between lug 33 and disc 47, permits initial inherent slow creep of the disc from its extreme contacts-closed configuration to an intermediate critical snap-acting configuration at which it snaps upward to its other extreme contacts-open configuration. Thus this clearance K assures that the preliminary creep action of the disc is not translated into preliminary creep opening of the contacts 27 and 31. As a result, these contacts are opened only in response to snap movement of the disc. This minimizes arcing at the contacts. The gaged adjusting means above described assures an accurate economical correlation of controlling factors, where these are of a low order of magnitude and were heretofore difficult and costly to control. This was particularly true in view of the fact that small ceramic pins such as 21 are not obtainable in closely matched lengths. In practice, such pins may be very small, such as on the order of 1/8 inch in diameter and 5/8 inch long, and their forming methods do not result in close tolerances. But, despite this, according to the present invention, close operating tolerances are obtained at low cost.

The subassembly of FIG. 1 is intended not only for the automatic reset switch of FIG. 2 but also for use in manufacturing manual reset switches, referred to in a copending patent application, Serial No. 113,502, simultaneously filed herewith on May 29, 1961 in the names of Raymond Joseph Ruckriegel, Frederick A. Kirchhubel and John O. Moorhead. In such case another lug would be required on the top of spring arm 29, as appears in said application.

In view of the above, it will be seen that the mechanical actuation of the switch contacts 27 and 31 occurs only within the so-called pure snap range of the bimetallic disc. Stated otherwise, movement of the disc in its creep range prior to pure snap movement is not permitted to be transmitted to the contacts during any action. And, in addition, the switch is trip-free. Ordinarily these features would be difficult to accomplish because of the former requirements for stocking many sizes of pre-sorted carefully gaged parts and the need for selective assembly of the same. As a result of the invention, switches of improved controlled quality and lower cost may be made.

It should be understood that although the invention has been described to open the contacts upon temperature rise, it is equally applicable on an automatic reset type of switch as shown in FIG. 2, wherein the contacts close upon temperature rise.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:
1. The method of locating a transfer member for lost-motion transmission of movement from a snap-acting thermostatic element to an adjustable spring-supporting means for a movable contact engageable with an adjustable fixed contact in the housing of a thermostatic switch; comprising adjusting the position of said spring-supporting means in a direction to engage the transfer member with deflection of the spring-supporting means to apply a predetermined force to the transfer member while the member is held with an equal and opposite force in a predetermined location relative to the housing, adjusting the fixed contact to engage the movable contact while the spring-supporting means is in its deflected position, releasing the holding force on the transfer member, and attaching the thermostatic element to the housing, said predetermined location of the transfer member having been chosen that after attachment of the thermosatic element the transfer member has sufficient lost motion between the spring-supporting means and the thermostatic element to take up initial creep movement of the thermostatic element without initial transfer of said movement to said contacts, but thereafter upon snap movement to transfer snap action thereto.

2. The method of locating a transfer pin in a housing for transmission of movement from a snap-acting thermostatic element carried on the housing to a spring which carries a movable contact engageable with a fixed contact in the housing, said fixed contact and the spring being supported on the housing by deformable adjusting supports on the housing; comprising holding the transfer pin with a predetermined force in a predetermined position with respect to the housing, deforming the spring support to force the spring against the transfer pin with an equal and opposite force, adjusting the fixed contact to engage the movable contact when the spring support is so adjusted, releasing the pin, and mounting the thermostatic element on the housing, said predetermined position of the pin being such that after mounting of the thermostatic element the pin has sufficient lost motion between the thermostatic element and the spring to transfer snap action of said thermostatic element thereto after some creep action of the thermostatic element.

References Cited in the file of this patent
UNITED STATES PATENTS

| | | |
|---|---|---|
| 1,997,262 | McGoldrick | Apr. 9, 1935 |
| 2,427,946 | Blosser et al. | Sept. 23, 1947 |
| 2,714,644 | Harrison | Aug. 2, 1955 |
| 2,795,678 | Mertler | June 11, 1957 |
| 2,824,194 | Moorhead | Feb. 8, 1958 |
| 2,873,328 | Hajny | Feb. 10, 1959 |
| 2,954,447 | Bolesky et al. | Sept. 27, 1960 |
| 3,081,388 | Cox | Mar. 12, 1963 |